(12) United States Patent
Korechika et al.

(10) Patent No.: US 8,002,312 B2
(45) Date of Patent: Aug. 23, 2011

(54) IMPACT REDUCING STRUCTURE OF VEHICLE

(75) Inventors: Koji Korechika, Saitama (JP); Bengt Pipkorn, Savedalen (SE); Jan Olsson, Partille (SE)

(73) Assignee: Autoliv Development AB, Vargarda (SE)

( * ) Notice: Subject to any disclaimer, the term of this patent is extended or adjusted under 35 U.S.C. 154(b) by 208 days.

(21) Appl. No.: 11/992,635

(22) PCT Filed: Sep. 11, 2006

(86) PCT No.: PCT/JP2006/317960
§ 371 (c)(1),
(2), (4) Date: Aug. 24, 2009

(87) PCT Pub. No.: WO2007/037113
PCT Pub. Date: Apr. 5, 2007

(65) Prior Publication Data
US 2010/0019477 A1    Jan. 28, 2010

(30) Foreign Application Priority Data
Sep. 27, 2005   (JP) .................. 2005-279555

(51) Int. Cl.
*B62D 7/22*   (2006.01)
(52) U.S. Cl. ................. 280/784; 180/274; 180/312
(58) Field of Classification Search .......... 180/274, 180/312; 280/784
See application file for complete search history.

(56) References Cited

U.S. PATENT DOCUMENTS

| | | | | |
|---|---|---|---|---|
| 3,752,247 A * | 8/1973 | Schwenk | ........... | 180/232 |
| 5,492,193 A * | 2/1996 | Guertler et al. | ........... | 180/232 |
| 6,131,685 A * | 10/2000 | Sakamoto et al. | ........... | 180/232 |
| 6,722,696 B2 * | 4/2004 | Sonomura et al. | ........... | 280/784 |
| 7,040,446 B2 * | 5/2006 | Anzai et al. | ........... | 180/312 |

FOREIGN PATENT DOCUMENTS

| | | |
|---|---|---|
| EP | 637522 A1 | 2/1995 |
| JP | 5-238287 A | 9/1993 |
| JP | 7-164895 A | 6/1995 |
| JP | 8-104254 A | 4/1996 |
| JP | 2005-088819 A | 4/2005 |
| WO | WO-2004/069586 A1 | 8/2004 |

* cited by examiner

*Primary Examiner* — Toan To
(74) *Attorney, Agent, or Firm* — Harness, Dickey & Pierce, P.L.C.

(57) ABSTRACT

A structure reduces impact force incurred when a structural body located forward of the vehicle interior comes toward the vehicle interior. The structure includes a pressing mechanism arranged forward of the vehicle interior. The pressing mechanism applies a pressure downwardly to the structure in order to restrict the structure from entering into the vehicle interior. The structure further includes a drive member to drive the pressing mechanism in the case of emergency.

24 Claims, 12 Drawing Sheets

IMPACT REDUCING STRUCTURE OF VEHICLE

CROSS REFERENCE TO RELATED APPLICATIONS

This application is a 371 National Stage of International application No. PCT/JP2006/317960, filed Sep. 11, 2006. This application claims the benefit of Japanese Patent Application 2005-279555, filed Sep. 27, 2005. The disclosures of the above applications are expressly incorporated herein by reference.

1. Field of the Invention

The present invention relates to an impact reducing structure for protecting occupants in a vehicle. In more detail, the present invention relates to a structure to reduce impact force to be applied to lower limbs of the occupant in a case of frontal collision or the like, which is caused by a heavy structure, such as an engine block, moving toward the vehicle interior.

2. Priort Art

When a frontal collision of a vehicle occurs, the occupant in the vehicle is forced to move forward by inertial force. If the occupant is fastening a seatbelt, the forward movement of the occupant is prevented to some extent by restriction effect of the shoulder belt and waist belt of the seatbelt device. However, in a case of frontal collision, a power train including an engine and a transmission may push back a toe board and enter in the vehicle interior, and lower limbs of the occupant may be damaged seriously.

Since injury of the lower limbs of the occupant due to a frontal collision of the vehicle is complicated in structure of born, the injury could be physical impediment needing a long term medical treatment, and therefore, it has been a social problem because of difficulty of complete rehabilitation. When discussing about a safety structure of vehicle body, this problem is important, especially for a vehicle such as a light car which is restricted in size and layout of design, it has been considered that it is difficult to reduce the degree of backward movement of the toe board and to reduce the amount of impact G (Gravity).

In International publication WO00/50270, as shown in FIGS. 15A to 15D, a structure in which an airbag is arranged inside of parallel two (double) toe boards is described. This reduces possibility of injury of the lower limbs of occupants.
Patent Reference 1: International publication WO00/50270

DISCLOSURE OF THE INVENTION

Problems to be Solved by the Invention

However, according to the structure shown in International publication WO00/50270, possibility of injury of the lower limbs of vehicle occupants could not be reduced sufficiently, although impact to the lower body of a vehicle occupant is decreased to some extent due to inflation of an airbag toward the vehicle interior.

The invention was made based on the above-described situation, and it is an object to provide a structure in which impact to the lower limbs of a vehicle occupant can be reduced effectively as compared to the prior art.

Means for Solving the Problems

A structure for reducing impact force according to the present invention is to protect an occupant in a vehicle interior, which reduces impact force, occurred when a structural body located out of and in front of the vehicle interior comes toward the vehicle interior. And the structure for reducing impact force is characterized by comprising: a pressing mechanism, which is arranged out of and in front of the vehicle interior to apply a pressure downwardly to the structural body in order to restrict the structural body from entering into the vehicle interior; and a drive member to drive the pressing mechanism in the case of emergency.

For example, said pressing mechanism is an inflatable airbag. And, said airbag is inflated in the case of emergency, so that the structural body is pressed downwardly to prevent or restrict the structural body from entering into the vehicle interior. At the same time, impact force applied from the structural body is absorbed by the airbag.

Preferably, said airbag is formed so that in a developed state a surface to be in contact with the slant portion of the structural body is inclined downwardly in the direction toward the vehicle interior. According this form, downward force could be applied to the structural body even if an inside wall (outer surface of the toe board) of an engine room is slightly inclined or stands upright.

Said pressing mechanism may be a movable plate or frame but not an airbag. Said plate or frame is driven in the case of emergency to apply a pressure downwardly to the structural body, moving toward the vehicle interior, and therefore, the structural body can be prevented or minimized from entering the vehicle interior. Here, a "plate or frame" includes a hard plate-shaped member, a hard framework and a hard bar, which have a sufficient stiffness and strength to be able to apply sufficient external force to the structural body.

As for driving of said plate or frame, for example, the plate or frame can be swung around a lower end thereof as a fulcrum, so that said plate or frame is swung in the case of emergency. Here, "swing" means movement of the plate or frame in which an upper end thereof falls down around a lower end thereof as a fulcrum, as a result, to apply a pressure downwardly to the structural body. When employing a plate or frame but not an airbag, the driving mechanism could be designed small in size. Taking a gas generator as an example, a micro gas generator (MGG) having a small capacity can be employed, so that the invention provides advantages of installation space and cost.

Here, "Vehicle Interior" means a space (cabin) inside the vehicle. In addition, "toward the vehicle interior" means a direction from the front of the vehicle to the rear of the vehicle.

As an "airbag", a metal bag which is shaped in box-like and folded may be used. For example, an airbag shown in WO 2004/69586 can be employed. A "driving member which inflates and develops an airbag" includes an inflator supplying an inflation gas into the airbag and a sensor detecting a collision of the vehicle.

A "structural body located outside and in front of the vehicle interior" includes a power train and battery (especially, a large size battery for an electric car) located in an engine room. In short, it means that a structural body could move in the case of emergency such as a frontal collision from the engine room side (front) toward the vehicle interior and could injure the lower limbs of an occupant.

A "power train" generally means a power transmission device, including an engine and transmission, according to the present invention, at least a part of a heavy structural body which could injure the lower limbs of an occupant. Therefore, a drive shaft, which is generally thought as a part of a power train, could be removed from the meaning of "power train" of the present invention. Further, if an engine is located behind the vehicle interior, the engine would not be a "power train" of the present invention.

An airbag can be arranged behind a structural body (vehicle interior side) or in front of and outside of a toe board (structural body side). In other words, an airbag can be arranged either outside the toe board or behind the structural body such as a power train. Here, "toe board" is a thin plate or board which is located around feet of the occupant to partition between the vehicle interior and a front space such as an engine room. According to the present invention, a toe board is exposed to a front space such as an engine room, but not a sheet having a lower stuffiness such as a carpet in the vehicle interior.

Preferably, said airbag is substantially first in contact with said structural body when the structural body moves toward the vehicle interior. Here, "substantially first in contact with" means that it is directly in contact with the structural body without any intermediation members, which substantially could absorb impact force themselves, such as a toe board and a floor pan having a sufficient stiffness.

Said airbag can be formed by providing a dual structure of a toe board in part. Further, said structural body may be provided with a slant portion which is to be in contact with the airbag in the case of emergency. In this case, said slant portion may be formed as a part of an outer frame of the structural body, or may be a flat plate or frame fixed on a vehicle interior side of the structural body, and or may be a block fixed on a vehicle interior side of the structural body.

BRIEF DESCRIPTION OF DRAWINGS

FIGS. 11(A) and (B) are schematic views showing the operation of the fourth embodiment.

FIGS. 12(A) and (B) are cross-sectional views illustrating a part of an impact reducing structure according to a fifth embodiment of the present invention, in which FIG. 12(A) shows non-operating state and FIG. 12(B) shows operating state.

DETAILED DESCRIPTION

Figure 1:
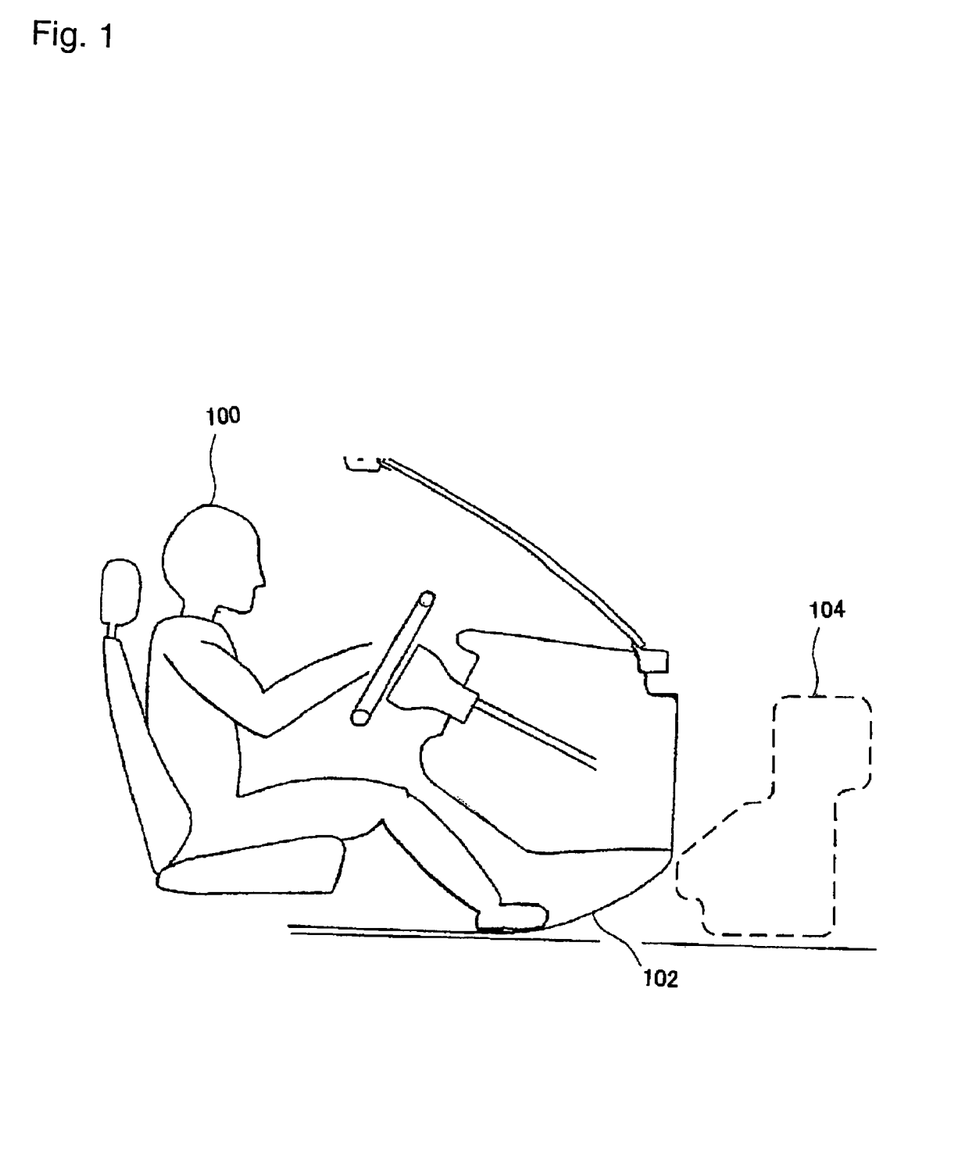
FIG. 1 is a schematic view illustrating a vehicle to which the present invention is applicable.

FIG. 1 is a schematic view illustrating a vehicle to which the present invention is applicable. It is shown that an occupant 100 is sitting in a vehicle interior. Reference numeral 102 indicates a toe board; and 104 indicates a power train (engine+transmission) located in an engine room.

Figure 2:
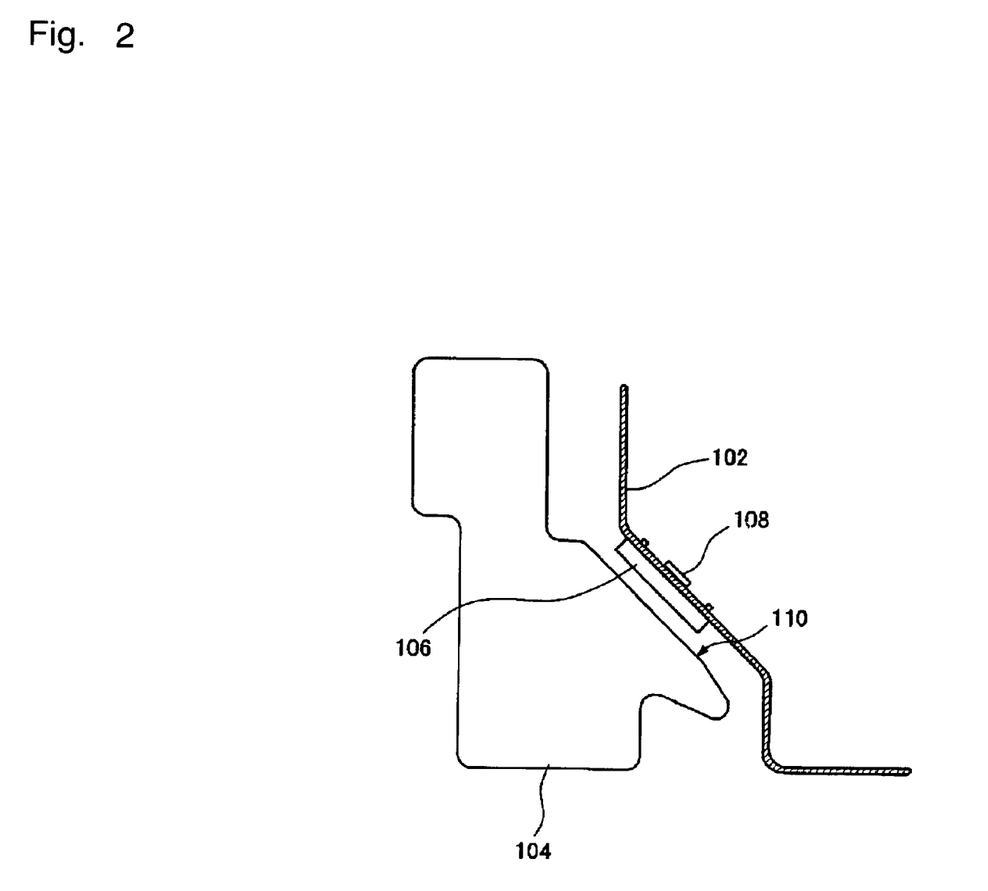
FIG. 2 is a cross-sectional view illustrating an impact reducing structure according to a first embodiment of the present invention, in which an airbag is in a pre-developed state (non-operating).
Figure 3:
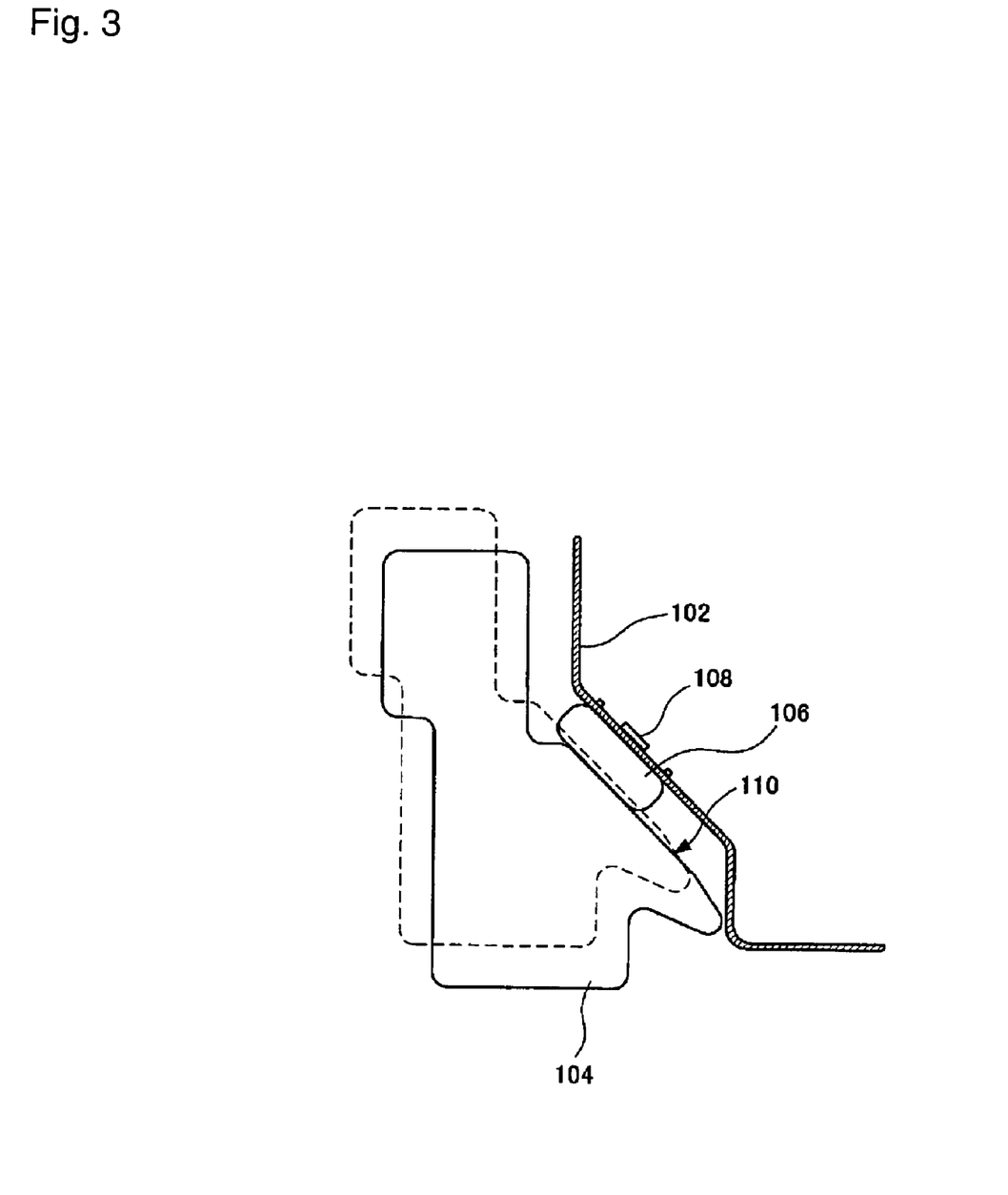
FIG. 3 is a cross-sectional view illustrating an impact reducing structure according to the first embodiment of the present invention, in which an airbag is in a developed state (operating).

FIG. 2 is a cross-sectional view illustrating an impact reducing structure according to a first embodiment of the present invention, in which an airbag is in a pre-developed state (non-operating). FIG. 3 is a cross-sectional view illustrating an impact reducing structure according to the first embodiment of the present invention, in which an airbag is in a developed state (operating). The toe board 102 is shaped to have a part inclined in a front-and-back direction of the vehicle, and an airbag 106 is fixed to the inclined part with bolts or the like. The airbag 106 is designed and arranged to be developed toward the power train 104. The power train 104 is provided with a slant surface 110, which is inclined substantially parallel to the inclined part of the toe board 102, at the rear side (vehicle interior side).

The toe board 102, to which the airbag 106 is fixed, is provided with a hole (not shown) through which inflation gas is supplied into the airbag 106, the hole being connected to an inflator 108. It is not shown but, the inflator 108 is covered with a carpet or the like located inside the vehicle interior. The inflator 108 is connected to a collision sensor (acceleration sensor), which is not shown, so that the inflator is operated responding to a signal from the sensor in the case of collision. The collision sensor can be used either in common with other airbags (front, curtain and side) or for itself.

The airbag 106 can be a metal airbag, which is shaped to be a box like and is folded. For example, the airbag shown in WO2004/69586 can be employed. The toe board 102 is required to have a sufficient strength to support development of the airbag 106, for example, the toe board can be formed with a metal plate having a thickness about 1.4 mm.

When an emergency, such as a frontal collision, occurs, as shown in FIG. 3, the airbag 106 is inflated. At this time, the power train 104 moves toward the vehicle interior (backwardly) and is in contact with the airbag 106 first. Thus, impact force toward the vehicle interior is absorbed directly by the airbag 106, the slant surface 110 is in contact with the airbag 106, and the power train 104 pushed downwardly toward the bottom of the vehicle. As a result, the power train 104 is prevented from entering into the vehicle interior, or impact force to the lower limbs of the occupant is reduced effectively even if the power train enters in the vehicle interior.

Figure 4:
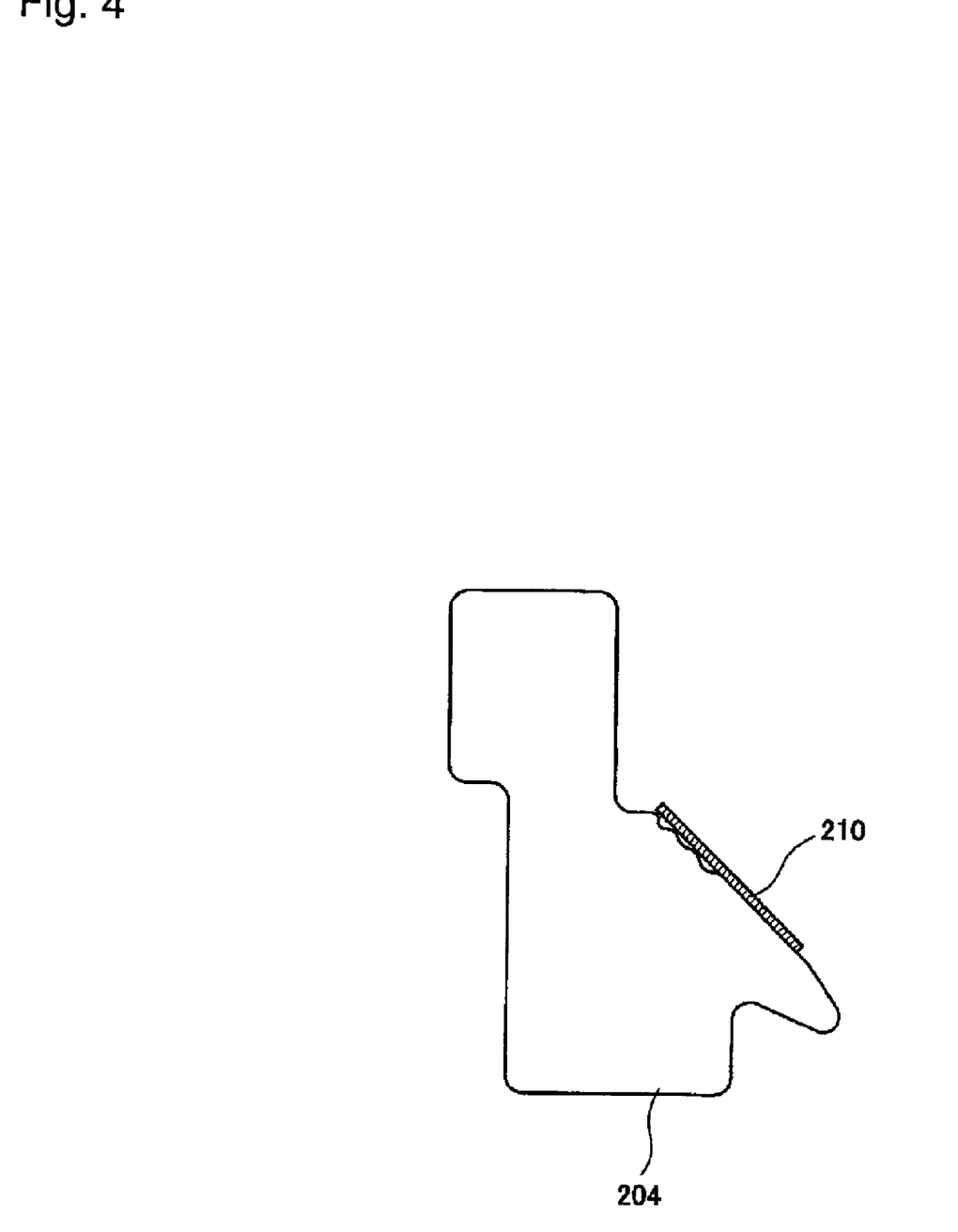
FIG. 4 is a schematic view illustrating a modification of the first embodiment, shown in FIGS. 2 and 3, in which a slider plate or a slider frame is shown.

FIG. 4 is a schematic view illustrating a modification of the first embodiment, shown in FIGS. 2 and 3, in which a slider plate or a slider frame 210 is shown. The slider plate or slide frame 210 is a metal plate or metal frame, which is fixed to an outer frame (outer surface) of the power train 204. The slider plate or frame 210 is beneficial especially when the power train 204 has a rough surface. The slider plate or frame 210 is to be in contact with the airbag 106 and is formed to have a flat surface, so that the power train is guided smoothly in an inclined-downward direction.

Figure 5:
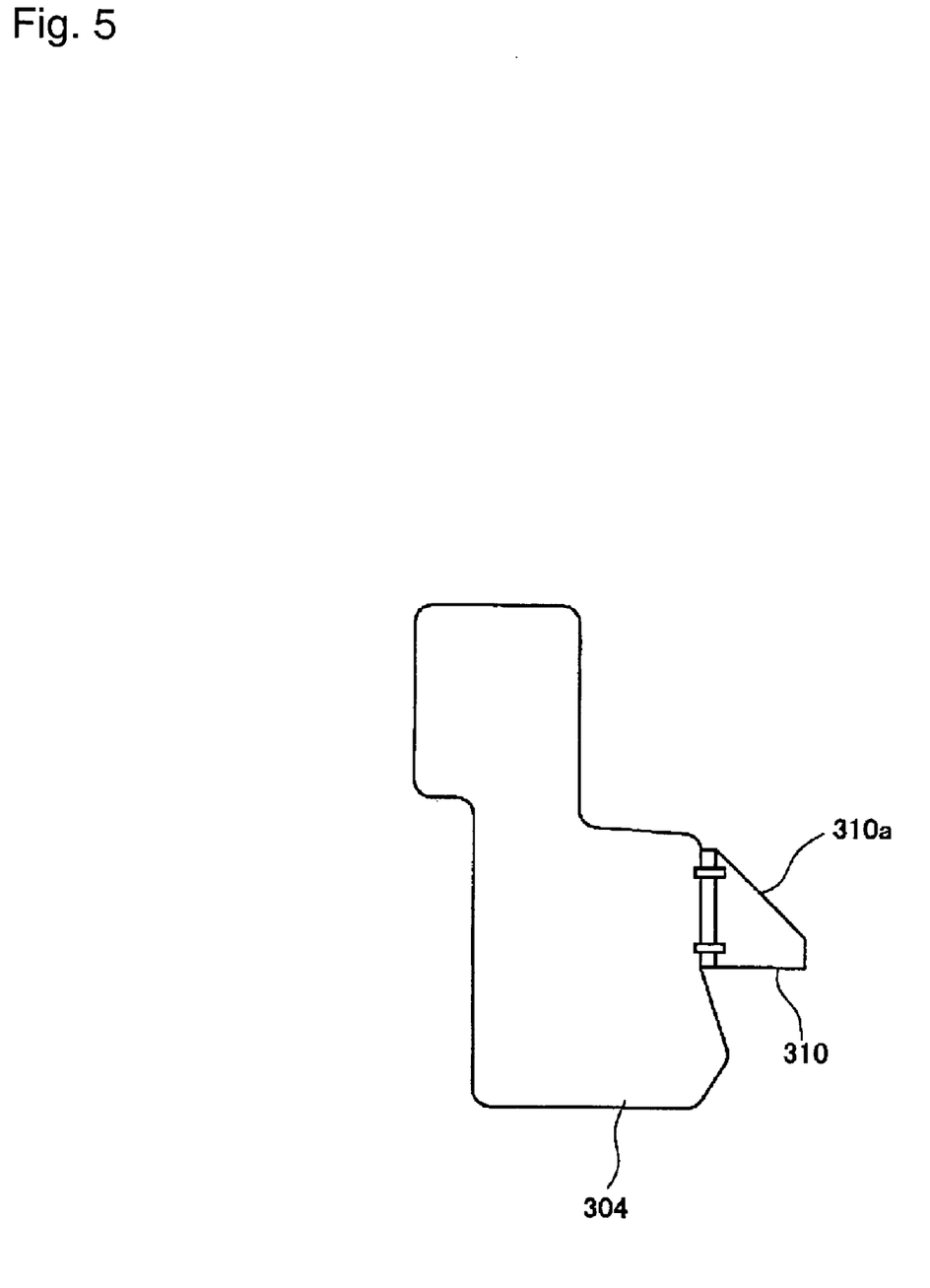
FIG. 5 is a schematic view illustrating a modification of the first embodiment, shown in FIGS. 2 and 3, in which a chute block is shown.

FIG. 5 is a schematic view illustrating a modification of the first embodiment, shown in FIGS. 2 and 3, in which a chute block 310 is shown. The chute block 310 is used as fixed to a power train 304, and is in contact with the airbag 106 in the case of emergency (frontal collision) in the same manner as the slider plate or frame 210. The chute block 310 may be formed as a casting of metal, such as aluminum. The chute block 310 is provided with a slant surface 310a, which is to be in contact with the airbag 106. Such chute block 310 would be effective if the power train 304 does not have any slant portion at the rear side thereof.

Figure 6:
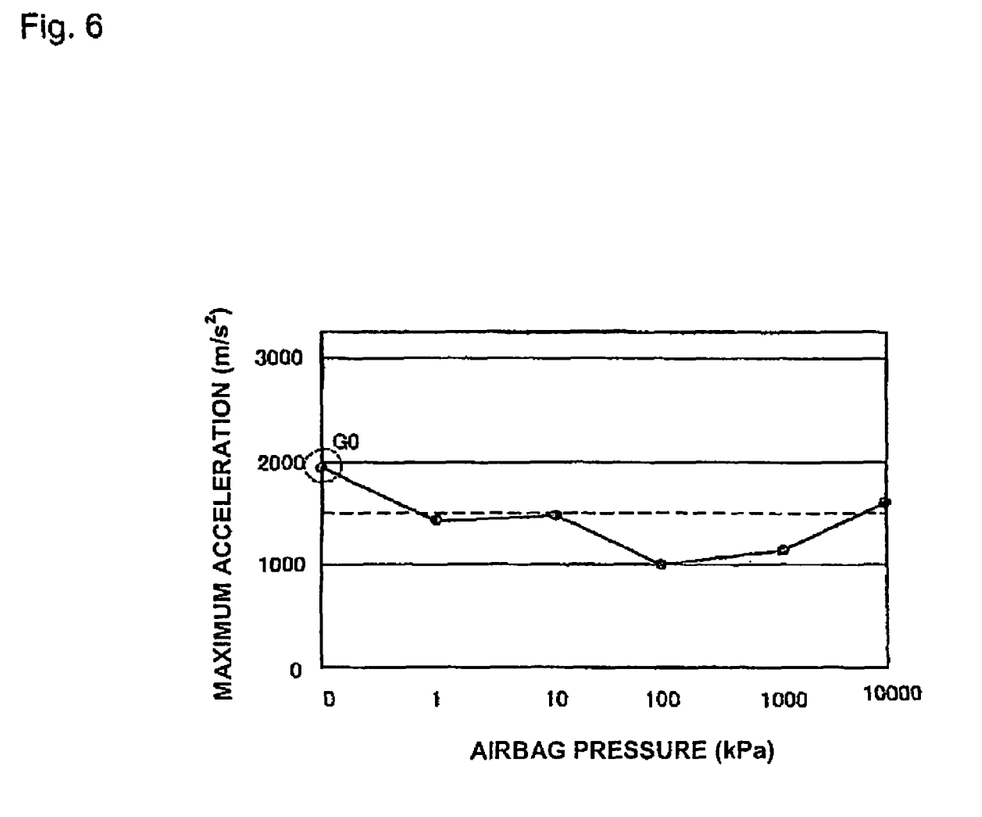
FIG. 6 is a graph showing the advantage of the present invention, in which the relation between interior pressure of an airbag and maximum acceleration (G) occurred in the case of collision.

FIG. 6 is a graph showing the advantage of the present invention, in which the relation between interior pressure of an airbag and maximum acceleration (G) occurred in the case of collision. According to this test, a toe board having a thickness of 1.4 mm is employed, and an application software "PAM-CRASH", which is industry consensus standard for collision analysis, is employed. A point encircled by a dotted line is a result of a conventional vehicle having no airbag. As understood from the graph, when the airbag 106 is used, a G value (Maximum Acceleration) occurred in the case of collision is effectively decreased. Further, when the interior pressure of the airbag is set at about 100 kPa to 1000 kPa (especially about 100 kPa), impact force is more effectively decreased.

Figure 7:
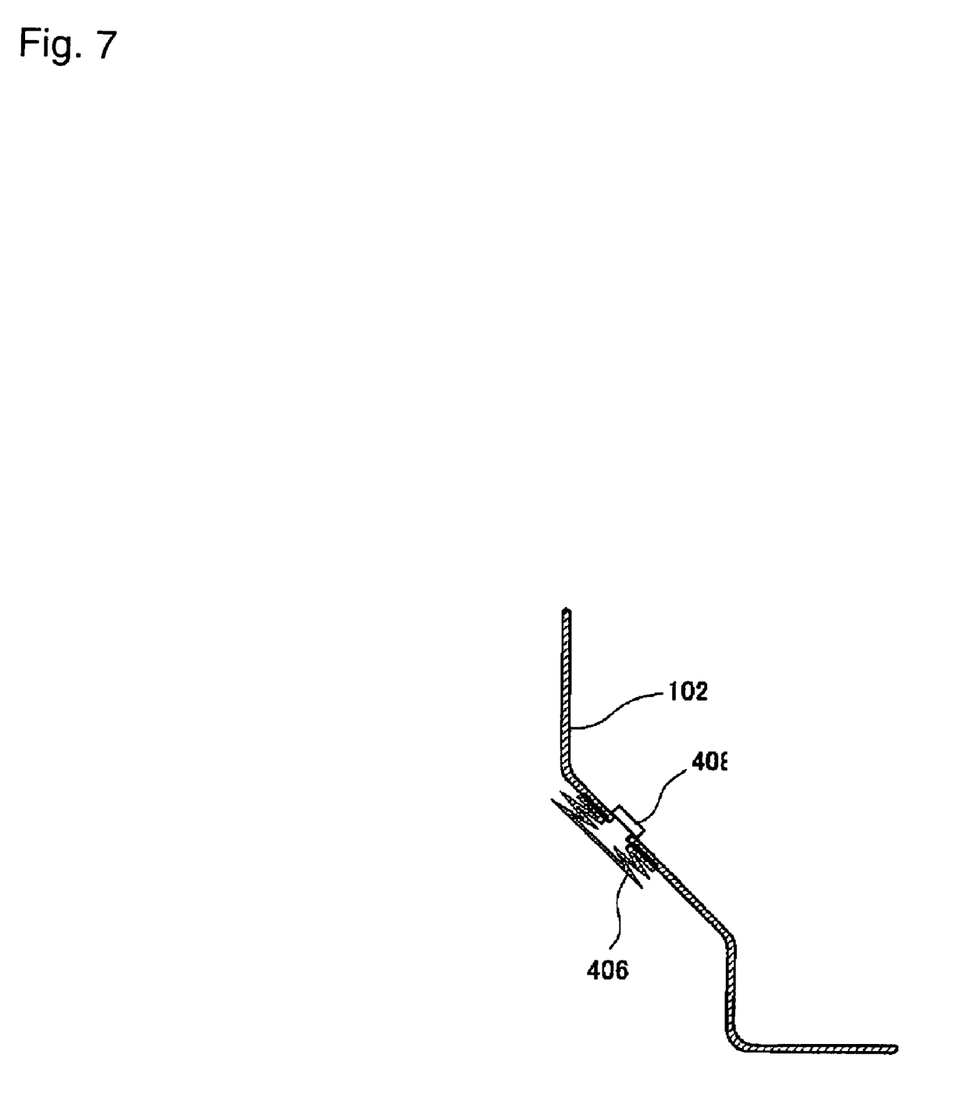
FIG. 7 is a cross-sectional view illustrating an important part of an impact reducing structure according to a second embodiment of the present invention.

FIG. 7 is a cross-sectional view illustrating an important part of an impact reducing structure according to a second embodiment of the present invention. According to this embodiment, a bag-shaped or box-shaped container 406, which is to form an airbag, is folded and fixed directly to a part of a toe board 102. The container 406 is, for example, welded to the toe board 102. In other words, it could be said that the toe board has a dual structure partially. The toe board 102 is provided at the corresponding portion with a hole for gas entrance, which is connected to an inflator 408. According to the present embodiment, the airbag could be formed in a process for forming the toe board 102, and therefore, the container 406 can be formed with the same material as the toe board 102.

Figure 8:
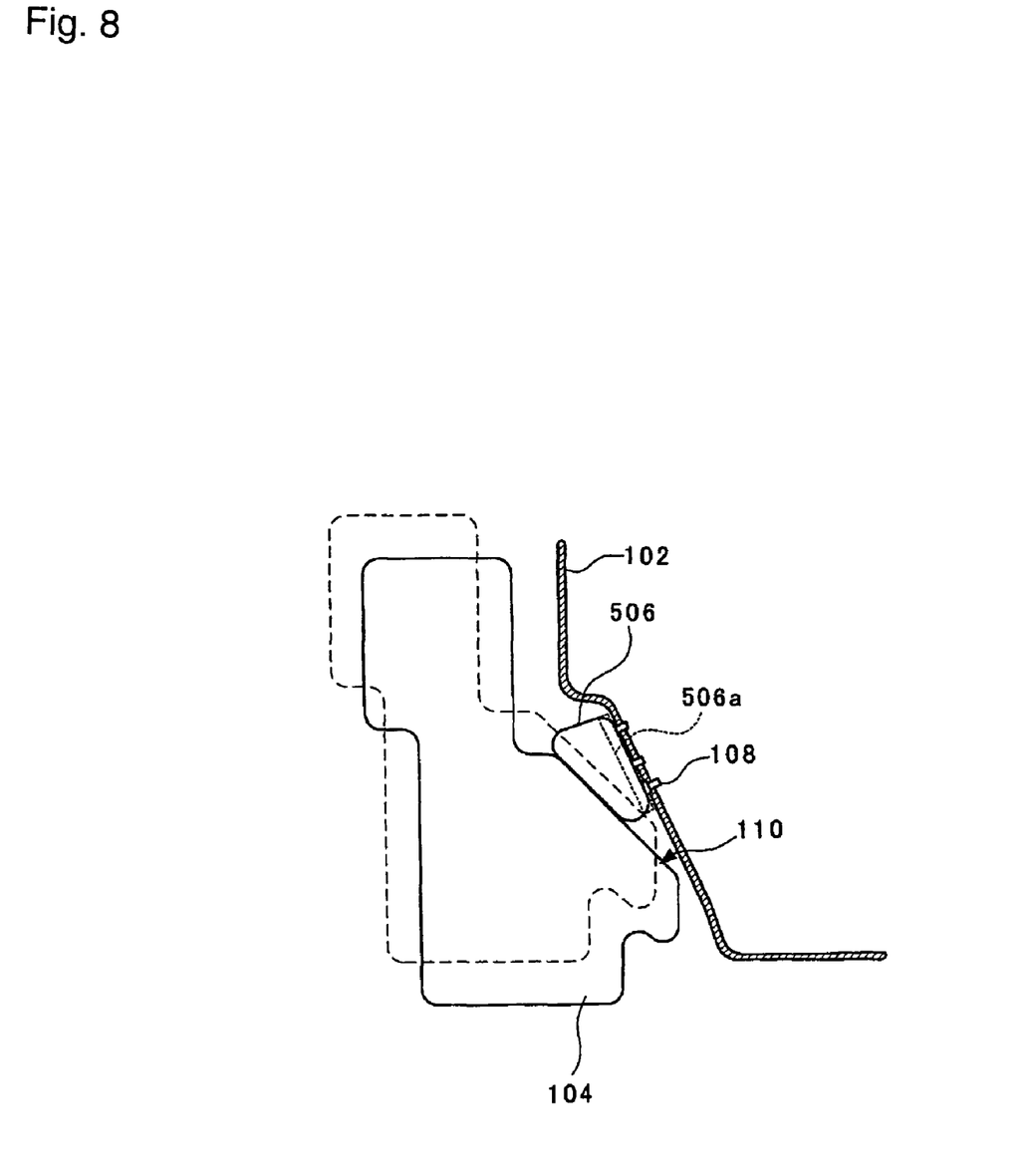
FIG. 8 is a cross-sectional view illustrating an important part of an impact reducing structure according to a third embodiment of the present invention.

FIG. 8 is a cross-sectional view illustrating an important part of an impact reducing structure according to a third embodiment of the present invention, in which a solid line 506 indicates that an airbag is developed and a broken line 506a indicate that the airbag is not developed (non-operative state). In FIG. 8, the same and corresponding components to those in the above-described embodiments are indicated by the same reference numerals, and the same description is not repeated. The toe board 102 is shaped to be inclined partially in the direction of front-and-back of the vehicle, in which an airbag 506 is fixed to the inclined portion with bolts or the like. The airbag 506 is designed and arranged so as to inflate toward a power train 104. The power train 104 is provided with a slant surface 110 extending in parallel with the inclined portion of the toe board 102.

The toe board 102, at which the airbag 506 is fixed, is provided with a hole through which an inflation gas is supplied into the airbag 506, the hole being connected to an inflator 108 such as a micro-gas-generator (MGG). It is not shown that the inflator 108 is covered with a carpet in the vehicle interior. The inflator 108 is connected to a collision sensor (acceleration sensor), which is not shown, so as to operate in response to a signal supplied from the sensor in the case of collision. Here, the collision sensor can be used commonly with other airbags (frontal, curtain, side), or be used independently for itself.

A feature of the present embodiment is on a shape of the airbag 506. The airbag 506 is designed to be shaped to have triangle side surfaces when inflated. The airbag 506 can be formed from a metal airbag shaped to be a triangular prism extending in the right and left direction of the vehicle and is folded. The toe board 102 is required to have a minimum (sufficient) strength to support the development of the airbag 106, for example, the toe board is formed from a metal plate having a thickness of about 1.4 mm.

When an emergency such as a frontal collision of the vehicle occurs, as shown in FIG. 8, the airbag 106 is inflated and developed. In this situation, the power train 104 moves toward the vehicle interior (backward), and is in contact with the airbag 506. Therefore, impact force toward the vehicle interior is directly absorbed by the airbag 506, the slant surface 110 is in contact with the airbag 506, and the power train 104 is pushed down toward the bottom of the vehicle. As a result, the power train 104 is prevented from entering into the vehicle interior or even if it enters into the vehicle interior, impact force to the lower limbs of the occupants is effectively reduced.

Figure 9:
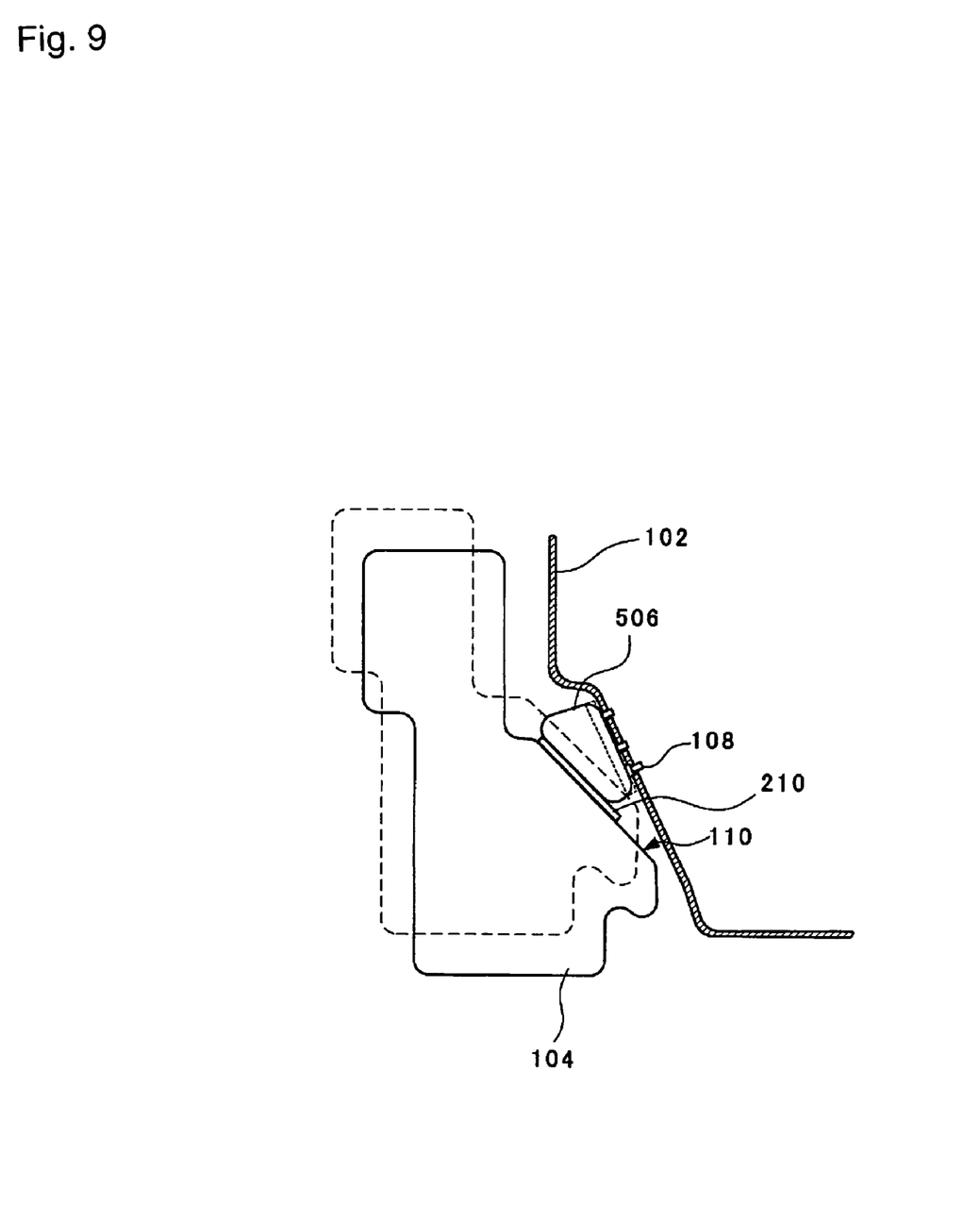
FIG. 9 is a cross-sectional view illustrating a modification of the impact reducing structure according to the third embodiment.

FIG. 9 is a cross-sectional view illustrating a modification of the impact reducing structure according to the third embodiment, in which a metal-made slider plate or frame 210 is fixed onto an outer frame (outer surface) of a power train 104 in the same manner as the structure shown in FIG. 4. The slider plate or frame 210 is useful when the power train 104 has a rough surface. The slider plate or frame 210 is to be in contact with the airbag 506, and is shaped to have a flat surface, so that the power train is smoothly guided downwardly in diagonal by pressure from the airbag 506. Further, the slider plate or frame may be fixed to the airbag 506 to obtain the similar effects. Further, a block 310, shown in FIG. 5, can be applied to the present embodiment.

Figure 10:
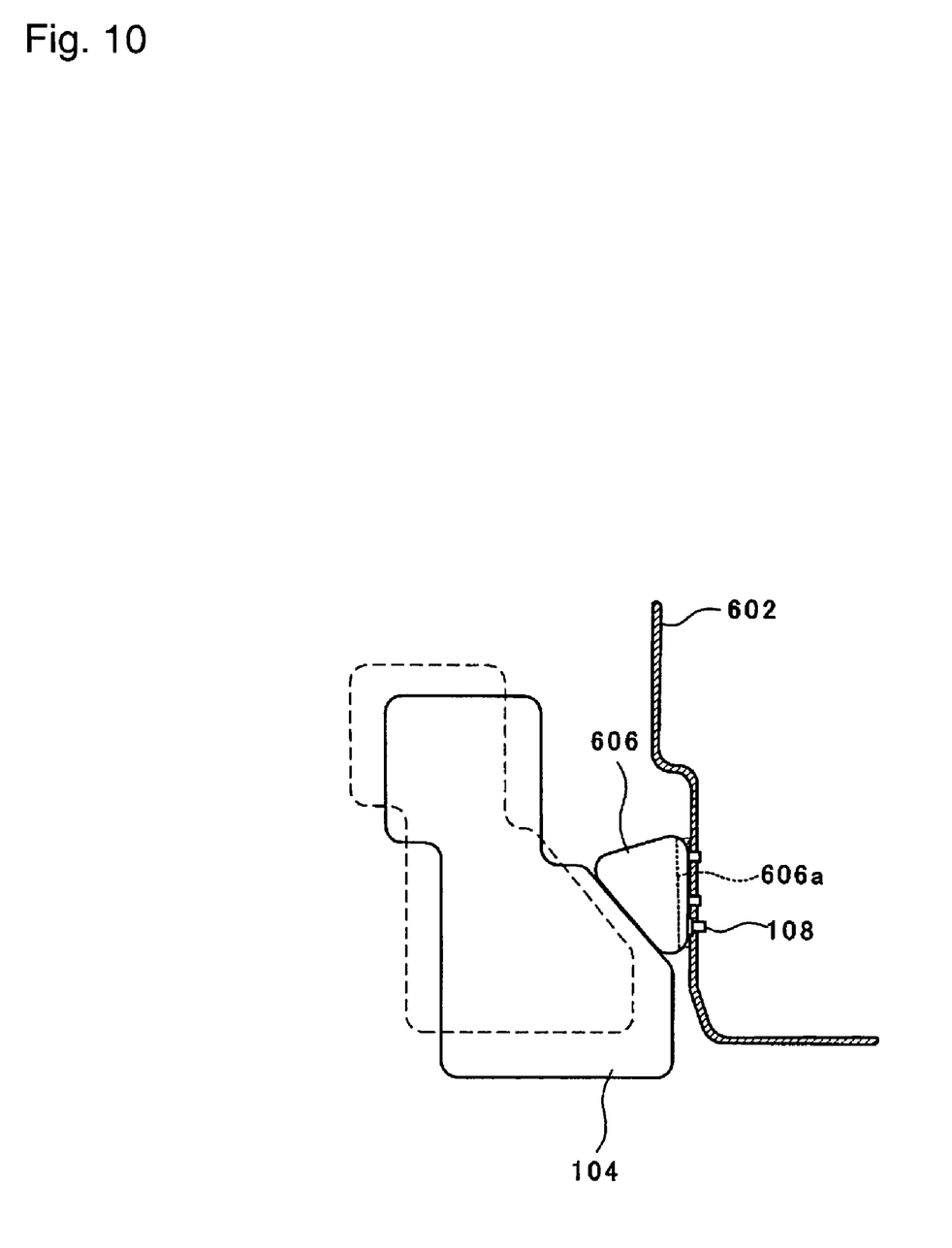
FIG. 10 is a cross-sectional view illustrating an important part of an impact reducing structure according to a fourth embodiment of the present invention.

FIG. 9 is a cross-sectional view illustrating an important part of an impact reducing structure according to a fourth embodiment of the present invention, in which a solid line 606 indicates that an airbag is developed and a broken line 606a indicate that the airbag is not developed (non-operative state). In FIG. 10, the same and corresponding components to those in the above-described embodiments are indicated by the same reference numerals, and the same description is not repeated. As compared with the other embodiments, the present embodiment is applied to a vehicle in which a toe board 602 stands upright. An airbag 606 is fixed to the toe board 602 with bolts or the like. The airbag 606 is designed and arranged to develop toward the power train 104. The power train 104 is provided with a slant (inclined) surface at its rear side (vehicle interior side).

The toe board 602, to which the airbag 606 is fixed, is provided with a hole (not shown) through which inflation gas is supplied into the airbag 606, the hole being connected to an inflator 108, such as a micro gas generator (MGG). It is not shown but, the inflator 108 is covered with a carpet or the like located inside the vehicle interior. The inflator 108 is connected to a collision sensor (acceleration sensor), which is not shown, so that the inflator is operated responding to a signal from the sensor in the case of collision. The collision sensor can be used either in common with other airbags (front, curtain and side) or for itself.

Figure 11:
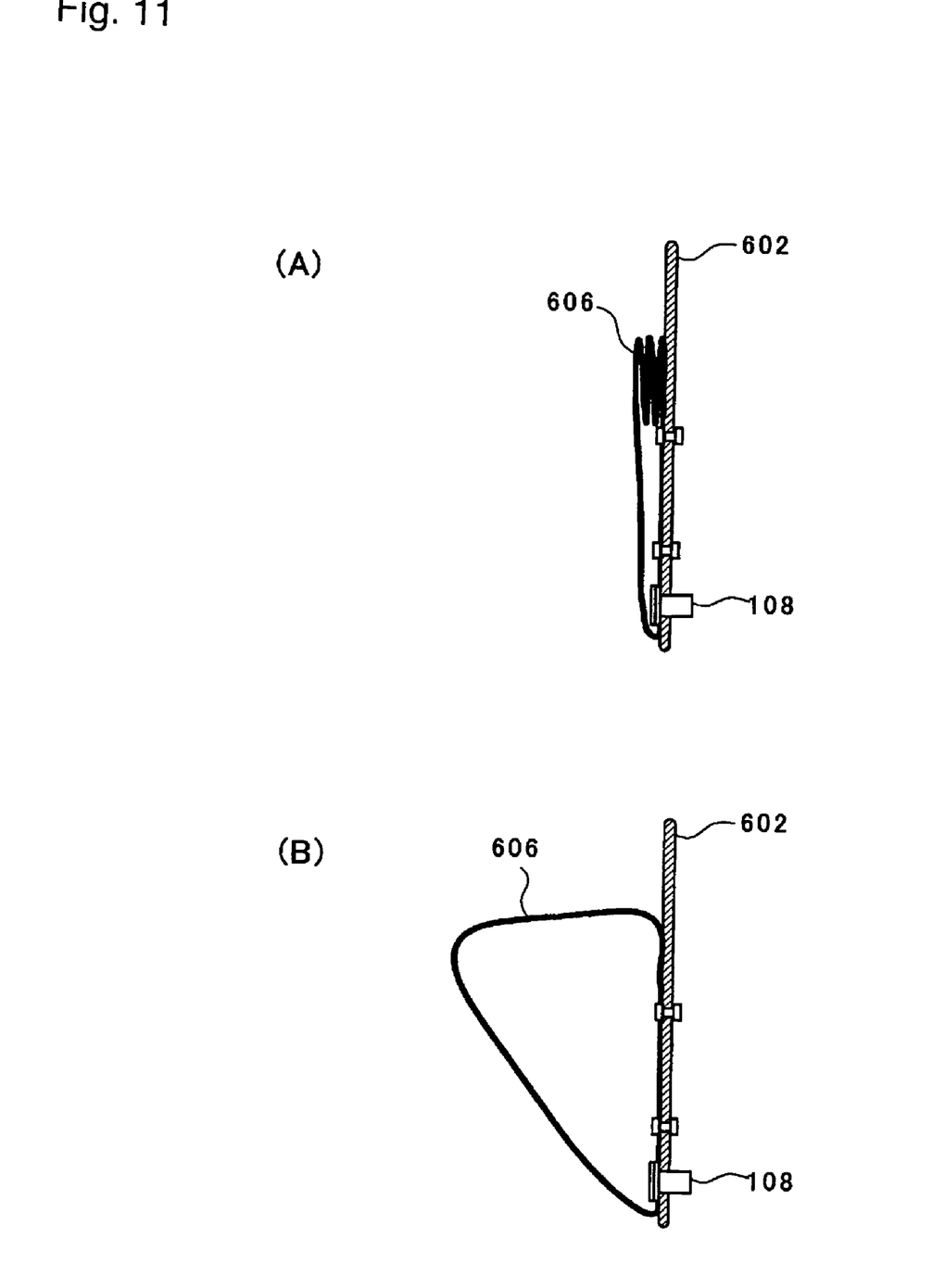

The airbag 606 is designed to have side faces of a reverse triangle when developed. The airbag 606 may be a metal airbag, which is shaped to be a triangular prism, and is folded as shown in FIG. 11(A). The toe board 602 is required to have a sufficient strength to support development of the airbag 606, for example, the toe board can be formed with a metal plate having a thickness of about 1.4 mm.

When an emergency such as a frontal collision of the vehicle occurs, as shown in FIGS. 10 and 11(B), the airbag 606 is inflated and developed. In this situation, the power train 104 moves toward the vehicle interior (backward), and is in contact with the airbag 506 firstly. Therefore, impact force toward the vehicle interior is directly absorbed by the airbag 606, and the power train 104 is pushed down toward the bottom of the vehicle in response to the contact with the airbag 606. As a result, the power train 104 is prevented from entering into the vehicle interior or even if it enters into the vehicle interior, impact force applied to the lower limbs of the occupants is effectively reduced.

Figure 12:
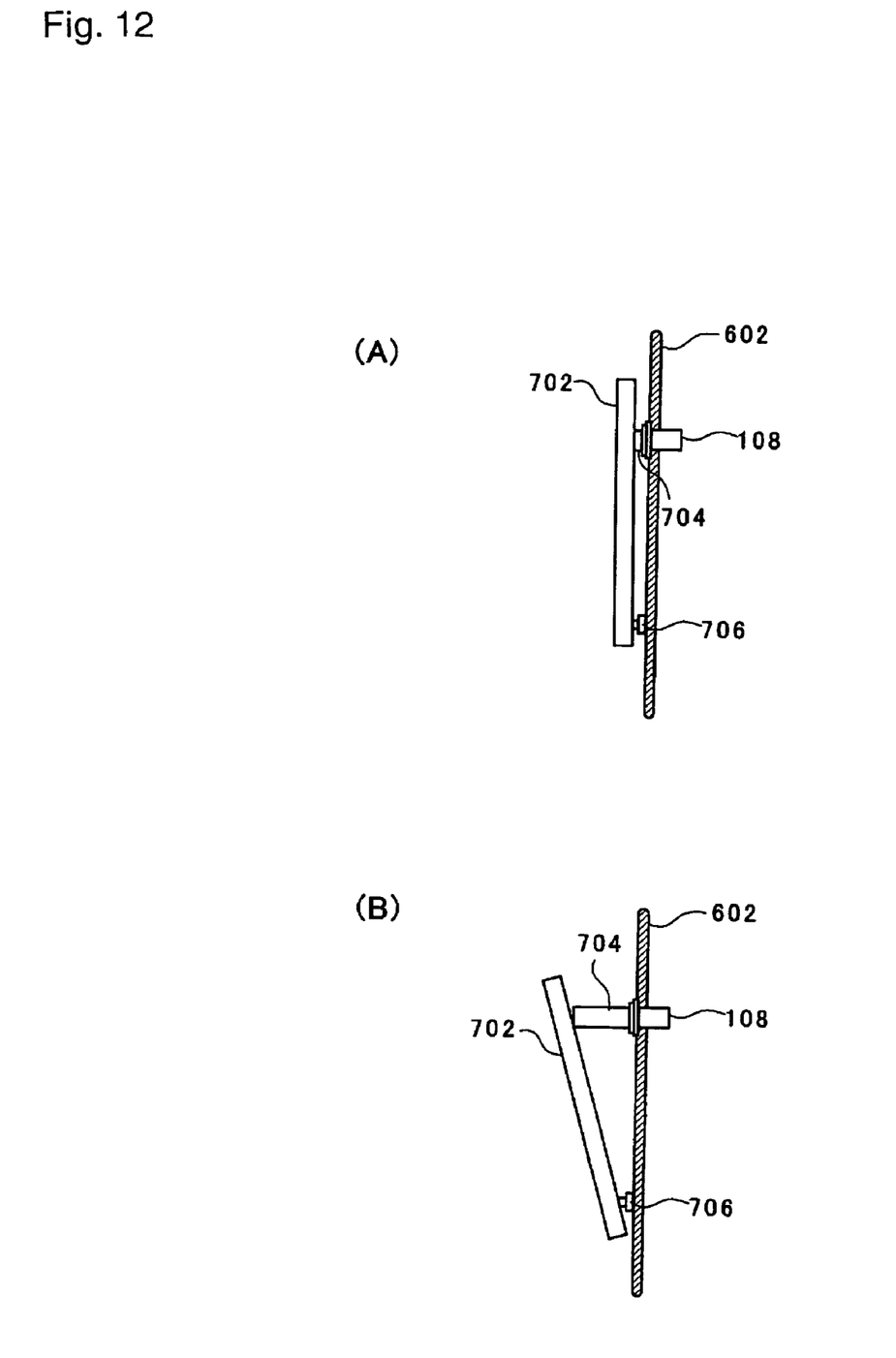

FIG. 12 is a cross-sectional view illustrating an important part of an impact reducing structure according to a fifth embodiment of the present invention, in which (A) shows non-operating state and (B) shows operating state. In FIG. 12, the same and corresponding components to those in the above-described embodiments are indicated by the same reference numerals, and the same description is not repeated. In the same manner as the fourth preferred embodiment, the present embodiment is also applied to a vehicle in which a toe board 602 stands upright. A feature of the present embodiment is that a power train (104) is pushed down toward the bottom of the vehicle with a structure without using an airbag.

According to the present embodiment, the power train (104) is pushed down with a movable plate 702 (pad or frame). When an emergency occurs, the plate 702 is driven to push the power train (104) moving toward the vehicle interior down toward the bottom of the vehicle and to prevent or minimize the power train (104) from entering into the vehicle interior. The plate 702 is required to have a sufficient stiffness and strength to supply a sufficient force to the power train.

The lower end of the plate 702 is fixed to the toe board 602 with bolts 706 so that the plate can swing around the fixed lower end as the fulcrum. A piston 704 can be used to drive the plate 702. The piston 704 is driven by a micro gas generator (MGG) 108. Since the plate 702 is employed instead of an airbag, a driving mechanism could be formed small in size. As for a gas generator, a micro gas generator (MGG) having a small capacity could be employed, so that advantaged of an installation space and costs could be obtained.

The toe board 602 is provided with a hole (not shown) through which inflation gas is supplied into a cylinder for the piston 704, the hole being connected to an inflator 108, such as a micro gas generator (MGG). It is not shown but, the inflator 108 is covered with a carpet or the like located inside the vehicle interior. The inflator 108 is connected to a collision sensor (acceleration sensor), which is not shown, so that the inflator is operated responding to a signal from the sensor in the case of collision. The collision sensor can be used either in common with other airbags (front, curtain and side) or for itself. The toe board 602 is required to have a sufficient strength to support development of the airbag 606, for example, the toe board can be formed with a metal plate having a thickness of about 1.4 mm.

When an emergency such as a frontal collision of the vehicle occurs, as shown in FIG. 12(B), the piston 704 is projected forward so that the upper side of the plate 702 is pushed forward and swings. In this situation, the power train (104) moves toward the vehicle interior (backward), and is in contact with the plate 702 firstly. Therefore, the power train (104) is pushed down toward the bottom of the vehicle in response to the contact with the plate 702. As a result, the power train (104) is prevented from entering into the vehicle interior or even if it enters into the vehicle interior, impact force applied to the lower limbs of the occupants is effectively reduced.

In the above, the embodiments of the present invention are described; the present invention is not limited by those embodiments, and can be modified within a technical scope described in the claims.

Description of Reference Symbols

100: Occupant
102: Toe Board
104, 204, 304: Power Train
106: Airbag
108: Inflator
110: Slant Surface

The invention claimed is:

1. A structure for reducing impact force to protect an occupant in a vehicle interior, the vehicle having a structural body forward of the vehicle interior, the structure for reducing impact force comprising:
a pressing mechanism arranged out of and in front of the vehicle interior to apply a pressure downwardly to the structural body in order to restrict the structural body from entering into the vehicle interior; and
a drive member to drive the pressing mechanism in the case of emergency;
wherein said pressing mechanism operates actively toward the structural body to apply a pressure to the structural body.

2. The structure for reducing impact force according to claim 1, wherein:
said pressing mechanism is an inflatable airbag;
said drive member is an inflator generating an inflation gas; and
said airbag is inflated by the inflation gas generated by the inflator in the case of emergency, so that impact force due to movement of the structural body toward the vehicle interior is absorbed by the airbag.

3. The structure for reducing impact force according to claim 2, wherein said inflator is a micro gas generator (MGG).

4. The structure for reducing impact force according to claim 2, wherein said airbag is arranged at a side of the structural body of a toe board.

5. The structure for reducing impact force according to claim 4, wherein said airbag is formed by providing a dual structure of the toe board partially.

6. The structure for reducing impact force according to claim 2, wherein said airbag is firstly in contact with the structural body substantially when the structural body moves toward the vehicle interior.

7. The structure for reducing impact force according to claim 1, wherein:
said structural body is provided with a slant portion which is to be in contact with the airbag in the case of emergency; and
said slant portion is inclined downwardly in the direction toward the vehicle interior.

8. The structure for reducing impact force according to claim 7, wherein said slant portion is formed as a part of an outer frame of the structural body.

9. The structure for reducing impact force according to claim 7, wherein said slant portion is a plate or frame fixed on a vehicle interior side of the structural body.

10. The structure for reducing impact force according to claim 7, wherein said slant portion is a block fixed on a vehicle interior side of the structural body.

11. The structure for reducing impact force according to claim 7, wherein said airbag is formed so that in a developed state a surface to be in contact with the slant portion of the structural body is inclined downwardly in the direction toward the vehicle interior.

12. The structure for reducing impact force according to claim 1, wherein said structural body is a power train, including an engine block.

13. The structure for reducing impact force according to claim 1, wherein said structural body includes a battery.

14. The structure for reducing impact force according to claim 1, wherein the drive member is activated to drive the pressing mechanism in response to a signal from a collision sensor.

15. A structure for reducing impact force to protect an occupant in a vehicle interior, the vehicle having a power train including an engine block forward of the vehicle interior, the structure for reducing impact force comprising:
   an inflatable airbag arranged out of and in front of the vehicle interior; and
   an inflator which generates an inflation gas to inflate and develop the airbag; wherein said airbag is inflated by the inflation gas generated by the inflator in the case of emergency, so that impact force due to movement of the power train toward the vehicle interior is absorbed by the airbag, said power train is provided with a slant portion which is to be in contact with the airbag in the case of emergency, and said slant portion is inclined downwardly in the direction toward the vehicle interior.

16. The structure for reducing impact force according to claim 15, wherein:
   said pressing mechanism is a movable plate or frame; and
   said plate or frame is driven by a driving member in the case of emergency to apply a pressure downwardly to the power train, moving toward the vehicle interior.

17. The structure for reducing impact force according to claim 16, wherein said driving member includes a piston which applies pressure to around an upper end portion of the plate or frame outwardly from the vehicle interior side and a gas generator which drives the piston.

18. The structure for reducing impact force according to claim 17, wherein said gas generator is a micro gas generator (MGG).

19. The structure for reducing impact force according to claim 16, wherein:
   said plate or frame is able to swing around a lower end thereof as a fulcrum; and
   said plate or frame is swung in the case of emergency to apply a pressure downwardly to the power train, moving toward the vehicle interior.

20. The structure for reducing impact force according to claim 16, wherein:
   said structural body is provided with a slant portion which is to be in contact with the plate or frame in the case of emergency; and
   said slant portion is inclined downwardly in the direction toward the vehicle interior.

21. The structure for reducing impact force according to claim 20, wherein said slant portion is formed as a part of an outer frame of the structural body.

22. The structure for reducing impact force according to claim 20, wherein said slant portion is a plate or frame fixed on a vehicle interior side of the structural body.

23. The structure for reducing impact force according to claim 20, wherein said slant portion is a block fixed on a vehicle interior side of the structural body.

24. A structure for reducing impact force to protect an occupant in a vehicle interior, the vehicle having a structural body forward of the vehicle interior, the structure for reducing impact force comprising:
   an inflatable airbag arranged to inflate forwardly of the vehicle interior and to apply a pressure downwardly to the structural body in order to restrict the structural body from entering into the vehicle interior; and
   an inflator for generating a gas to inflate the inflatable airbag in response to a predetermined event such that impact force due to movement of the structural body toward the vehicle interior is absorbed by the inflatable airbag.

* * * * *